United States Patent [19]

Ishida et al.

[11] Patent Number: 5,164,133
[45] Date of Patent: Nov. 17, 1992

[54] PROCESS FOR THE PRODUCTION OF MOLDED ARTICLE HAVING POSITIVE TEMPERATURE COEFFICIENT CHARACTERISTICS

[75] Inventors: Takafumi Ishida; Hitoshi Miyake, both of Sodegaura, Japan

[73] Assignee: Idemitsu Kosan Company Limited, Tokyo, Japan

[21] Appl. No.: 636,496

[22] Filed: Dec. 31, 1990

[30] Foreign Application Priority Data

Jan. 12, 1990 [JP] Japan .................................. 2-4716

[51] Int. Cl.⁵ .................. C04B 35/00; B29C 47/38; B29C 47/78
[52] U.S. Cl. ................... 264/105; 264/176.1; 264/211.21; 264/211.24
[58] Field of Search ............ 264/104, 105, 176.1, 264/211.21, 211.24; 252/502, 510, 511

[56] References Cited

U.S. PATENT DOCUMENTS 4,732,701 3/1988 Nishii et al. ................... 252/511

Primary Examiner—James Lowe
Assistant Examiner—Christopher A. Fiorilla
Attorney, Agent, or Firm—Frishauf, Holtz, Goodman & Woodward

[57] ABSTRACT

A process for the production of a molded article having positive temperature coefficient characteristics from a resin composition containing a crystalline resin, electrically conductive particles and an organic peroxide. A molded article having excellent PTC characteristics over that of a conventional molded article can be obtained by a process which includes mixing the crystalline resin and the electrically conductive particles to obtain a mixture; crosslinking the crystalline resin with the organic peroxide by kneading the mixture under a shear force; and simultaneously or successively molding the resultant kneaded mixture.

17 Claims, 2 Drawing Sheets

PROCESS FOR THE PRODUCTION OF MOLDED ARTICLE HAVING POSITIVE TEMPERATURE COEFFICIENT CHARACTERISTICS

BACKGROUND OF THE INVENTION

1. Field of the Invention

This invention relates to a process for the production of a molded article having positive temperature coefficient characteristics, and specifically, to a process for the production of a molded article having characteristics that its resistance value (resistivity) increases with an increase in temperature, i.e. positive temperature coefficient (PTC) characteristics.

More specifically, this invention relates to a process for the efficient production of a molded article having positive temperature coefficient characteristics usable as a heating element, overcurrent protective element, or the like for a variety of uses.

2. Prior Art

In general, a molded article produced from a resin composition imparted with suitable electrical conductivity (suitable resistance value) by incorporating electrically conductive particles such as carbon black particles, etc., into a crystalline resin has positive temperature coefficient (PTC) characteristics, i.e. a positive coefficient for an increase in resistance value with an increase in temperature. Such a molded article is used in various fields including a heating element, an overcurrent protective element, a temperature protective element, and the like.

A molded article having positive temperature coefficient characteristics, obtained from such a resin composition, is particularly useful, since it has excellent formability or moldability, lightweight properties, flexing characteristics or flexibility over a conventional molded article having positive temperature coefficient characteristics, obtained from an inorganic compound.

Such a conventional molded article having positive temperature coefficient characteristics is produced by a process disclosed in JP-A-62-232903, which comprises kneading a mixture of a crystalline resin, electrically conductive particles (carbon black particles in particular) and organic peroxide at a temperature of not lower than the melting point of the above crystalline resin and at a temperature of not higher than the one minute half-value period temperature of the above organic peroxide; pressing the resultant kneaded mixture into a sheet at a temperature of the above half-value period temperature; and thereafter crosslinking the above crystalline resin. There is another process disclosed in JP-A-62-232902, which comprises crosslinking the above crystalline resin in an inert gas atmosphere; pulverizing the crosslinked product; mixing it with rubber or the like: and molding the resultant mixture to obtain a molded article.

However, the above processes have the following problem; Since the crosslinking treatment is carried out at a temperature of the one minute half-value period temperature of the organic peroxide and under such moderate conditions that no shear force is exerted on the kneaded mixture, the resultant molded article has a low rate of an increase in resistance value with an increase in temperature (insufficient PTC characteristics). The above processes also have a problem in that the operation of the (press)-molding is complicated and the continuous production is very difficult.

Meanwhile, there is another process which comprises adding a crosslinking agent while a polymer and electrically conductive particles are kneaded; crosslinking the polymer while the resultant mixture is kneaded to prepare pellets of a crosslinked kneaded mixture; and then, molding the pellets into an article (see JP-A-63-181401).

However, the above process has the following problems; The kneaded mixture to be molded is a composition whose crosslinkage has been already completed, and it is hence difficult to melt. Therefore, the above kneaded mixture is hard to mold. Further, when it is molded by applying a shear force to excess, the resultant molded article sometimes shows too high an initial resistance value (low-temperature resistance value) or a low rate of an increase in resistance value with an increase in temperature (PTC characteristics) due to re-breakage of its crosslinked chains.

SUMMARY OF THE INVENTION

This invention has been made in view of the above problems, and it is an object of this invention to provide a process for the efficient production of a molded article having excellent positive temperature coefficient characteristics that the resistance value of the molded article greatly increases with an increase in temperature.

The present inventors have made a diligent study, and found that the above object can be achieved by employing a specific process which comprises crosslinking a crystalline resin, which is one component of a resin composition for a molded article having positive temperature coefficient characteristics, with organic peroxide while the crystalline resin and electrically conductive particles are kneaded under a shear force, and simultaneously or successively molding the resultant kneaded mixture. This invention has been completed on the basis of this finding.

That is, the process for the production of a molded article having positive temperature coefficient characteristics, provided by this invention, comprises mixing a crystalline resin with at least electrically conductive particles to prepare a uniform mixture without crosslinking the crystalline resin substantially; crosslinking the crystalline resin with organic peroxide by kneading the mixture under a shear force; and simultaneously or successively molding the resultant kneaded mixture.

DETAILED DESCRIPTION OF THE INVENTION

Figure 1:
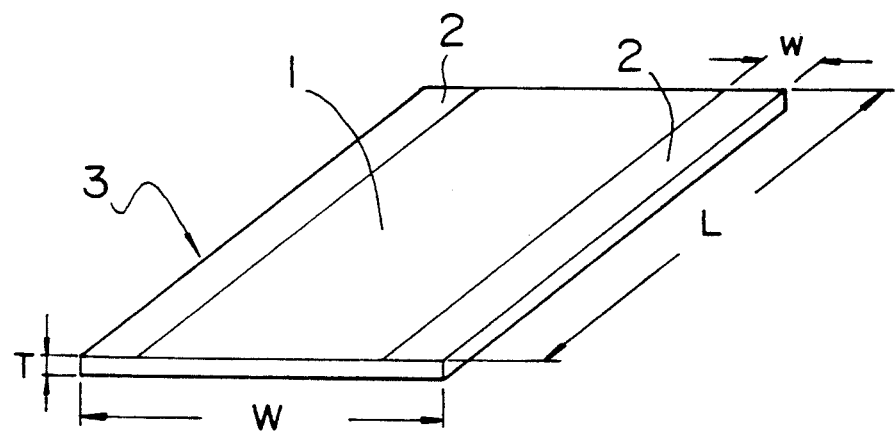
FIG. 1 is a perspective view showing a test piece with an electrode attached.

In this invention, the above crystalline resin can be selected from a variety of crystalline thermoplastic resins.

Examples of the crystalline thermoplastic resins are a polyolefin resin and an olefin copolymer, a polyamide resin, polyacetal, a thermoplastic polyester resin, a polyphenylene oxide and nonyl resin, polysulfone, etc.

Examples of the above polyolefin resin are polyethylenes such as high-density polyethylene, intermediate- or low-density polyethylene and linear low-density polyethylene; polypropylenes such as isotactic polypropylene and syndiotactic polypropylene: polybutene; 4-methylpentene resin; syndiotactic polystyrene; and the like.

Further, the crystalline resin can be also selected from an ethylene-propylene copolymer, an ethylene-vinyl acetate copolymer, ethylene-acrylate type copolymers such as an ethylene-acrylic acid copolymer, an ethylene-ethylacrylate copolymer, an ethylene-methylacrylate copolymer, a copolymer of an olefin with a vinyl compound such as an ethylene-vinyl chloride copolymer, a fluorine-containing ethylene copolymer, and modified products of these.

Examples of the above vinyl acetate-containing resin are a vinyl acetate resin, polyvinylacetoacetal and polyvinyl butyral.

Examples of the above polyamide resin are nylon 6, nylon 8, nylon 11, nylon 66 and nylon 610.

The above polyacetal may be a homopolymer or a copolymer.

Examples of the above thermoplastic polyester resin are polypropylene terephthalate and polybutylene terephthalate.

Furthermore, the above crystalline thermoplastic resin can be selected from diene-based polymers and copolymers such as trans-1,4-polyisoprene and syndiotactic-1,2-polybutadiene.

The above various crystalline thermoplastic resins may be used alone or in combination as a polymer blend.

Of the above crystalline thermoplastic resins, particularly preferred are polyolefin resins such as high-density polyethylene, low-density polyethylene and linear polyethylene; olefin copolymers such as an ethylene-vinyl acetate copolymer and an ethylene-ethyl acrylate copolymer; fluorine-containing ethylene copolymers; diene-based polymers such as trans-1,4-polyisoprene, and the like.

In addition, the above crystalline thermoplastic resins may be used as a composition which contains other polymer, an additive, etc., in such an amount that does not affect the object of this invention.

In this invention, the above electrically conductive particles can be selected from particles such as carbon black particles and graphite particles, powders such as a metal powder and a metal oxide powder, fibers (milled fibers) such as a carbon fiber, and the like. Of these, particles such as carbon black particles and graphite particles are preferred, and carbon black particles are particularly preferred.

The above electrically conductive particles may be used alone or in combination.

There is no special limitation to be imposed on the particle diameter of the above electrically conductive particles. In general, the above particles usable as the electrically conductive particles have an average particle diameter of 10 to 200 nm, preferably 15 to 100 nm. The above fibers usable as the electrically conductive particles have an aspect ratio of 1 to 1,000, preferably about 1 to 100.

The proportion by weight between the above crystalline resin and carbon black particles, which are typically electrically conductive, is 10–80:90–20, preferably 55–75:45–25.

When the proportion of the electrically conductive particles is too low, the resultant molded article has too high a resistance value (resistivity), and when such a molded article is used as a heating element, the heating element sometimes fails to emit heat practically fully. Meanwhile, when the above proportion is too high, the resultant molded article sometimes fails to exhibit positive temperature coefficient characteristics.

In this invention, examples of the organic peroxide are benzoyl peroxide, lauroyl peroxide, dicumyl peroxide, tert-butyl peroxide, tert-butylperoxybenzoate, tert-butylcumyl peroxide, tert-hydroperoxide, 2,5-dimethyl-2,5-di(tert-butylperoxy)hexane, 2,5-dimethyl-2,5-di(-tert-butylperoxy)hexyne-3, 1,1-bis(tert-butylperoxyisopropyl)benzene, 1,1-bis(tert-butylperoxy)-3,3,5-trimethylcyclohexane, n-butyl-4,4-bis(tert-butylperoxy)valarate, 2,2-bis(tert-butylperoxy)butane, tert-butylperoxybenzene, and the like.

Particularly preferred of these are 2,5-dimethyl-2,5-di(tert-butylperoxy)hexyne-3, etc.

The above organic peroxides may be used alone or in combination. Further, crosslinking auxiliaries such as triallylcyanurate, divinylbenzene and triallylisocyanurate may be added.

The amount of the above organic peroxide per 100 parts by weight of the crystalline resin is generally 0.01 to 5 parts by weight, preferably 0.05 to 2 parts by weight.

On one hand, when the above amount is less than 0.01 part by weight, no crosslinking proceeds fully. As a result, there are likely to be problems that no positive temperature coefficient characteristics are exhibited sufficiently and a decrease in resistance is observed in a high-temperature range. On the other hand, when the above amount exceeds 5 parts by weight, the degree of crosslinking is increased too high, and as a result, there is sometimes a phenomenon of a decrease in moldability and a decrease in positive temperature coefficient characteristics.

In the process of this invention, a uniform mixture is first obtained by mixing the above crystalline resin with at least the electrically conductive particles (this step will be sometimes referred to as "step 1" hereinafter).

The step 1 may be carried out in the presence or absence of the above organic peroxide which is a crosslinking agent, or the step 1 may be carried out by mixing the crystalline resin with the electrically conductive particles in the absence of the organic peroxide at an initial stage, then adding the organic peroxide and continuing to mix them in the presence of the organic peroxide. That is, the above organic peroxide may be incorporated into the crystalline resin or the electrically conductive particles, or both prior to the mixing treatment, or it may be added or an additional amount thereof may be added at any time during the above mixing treatment. Or, no organic peroxide may be added in the step 1. In short, the important point in the step 1 is that even if the organic peroxide is used, the electrically conductive particles are mixed and dispersed with/in the above crystalline resin in such a state that the crystalline resin is substantially not crosslinked.

The mixing treatment in the step 1 is carried out so as to form a fully homogeneous mixture of the crystalline resin, the electrically conductive particles and optionally other components such as the above organic peroxide.

Therefore, the mixing treatment in the step 1 is preferably carried out at a temperature of not lower than the melting point of the crystalline resin.

The point to be noted here is that the step 1 is desirably to be effected in such a manner that the crosslinking reaction of the crystalline resin is controlled so as not to proceed much.

The reason for the foregoing is that when the crosslinking reaction is completed or allowed to proceed much during the mixing treatment in the step 1, the resultant molded article sometimes shows insufficient positive temperature coefficient characteristics, it is sometimes difficult to mold the mixture, or a crosslinked structure is re-broken under a shear force, which decreases the mechanical strength of the resultant molded article. Therefore, it is desirable to carry out the mixing treatment in the step 1 at a temperature of not lower than the melting point of the crystalline resin and in a temperature range in which the crosslinking reaction does not take place.

The dispersibility of each component and the crosslinking reaction of the crystalline resin in the above mixing treatment can be suitably controlled at the same time by properly setting and adjusting conditions such as a mixing treatment temperature, etc.

The conditions such as a mixing treatment temperature, etc., cannot be uniformly defined, since such conditions differ depending upon whether or not to add the organic peroxide and upon some other conditions.

Two typical methods (methods A and B) for carrying out the step 1 will be explained below.

Method A

In this invention, the following method A can be suitably employed for the step 1.

In the method A, the above crystalline resin, the above electrically conductive particles and the above organic peroxide are blended in the above-specified amounts, and mutually mixed to obtain a mixture.

In this case, the mixing temperature is, in general, a temperature of not lower than the melting point of the crystalline resin. In order to further improve the dispersibility of the electrically conductive particles in the crystalline resin, and in order to suitably control the crosslinking reaction with the organic peroxide, the mixing temperature is preferably in the range of from a temperature which is 20° C. higher than the melting point of the resin to a temperature which is 20° C. lower than the one minute half-value period temperature of the organic peroxide. The "one minute half-value period temperature of an organic peroxide" in this invention means a temperature at which the time required from decomposition of the organic peroxide to reduction of an active oxygen amount thereof to ½ is one minute, such a temperature can be determined by measuring the organic peroxide for a decomposition rate coefficient, time, decomposition amount and initial concentration.

Specifically, the one minute half-value period temperature is determined as follows. A solution having an organic peroxide concentration of 0.1 mole/l (sometimes 0.05 mole/l) is prepared by dissolving the organic peroxide in a solvent comparatively inert to radicals, e.g. benzene, and charged into a glass tube in which nitrogen has been substituted, and the tube is sealed. The sealed tube is immersed in a constant-temperature bath to thermally decompose the organic peroxide. Since the decomposition reaction can be considered to be a primary reaction, the following equations are established.

$$dx/dt = k(a-x) \quad (1)$$

$$ln[a/(a-x)] = kt \quad (2)$$

wherein x denotes an amount of decomposed peroxide, k denotes a decomposition rate coefficient, t denotes a time, and a denotes an initial concentration of the peroxide.

Since, a half-value period is a time during which the concentration of the peroxide decreases to ½ of the initial concentration thereof by decomposition, the half-value period is expressed by $t_{\frac{1}{2}}$, and a/2 is substituted for x in the above equation (2).

$$kt_{\frac{1}{2}} = ln2 \quad (3)$$

Therefore, an organic peroxide is thermally decomposed at a constant temperature, and a relationship of a time (t) − ln[a/(a-x)] is plotted. k is determined on the basis of a gradient of the resultant line, and a half-value period ($t_{\frac{1}{2}}$) at the constant temperature is determined on the basis of the above equation (3).

The above mixture may be recovered in any form. In general, it is recovered in a pellet form.

The recovered mixture in a form of pellets, etc., is generally transferred to a next step (a kneading and crosslinking, and simultaneous or subsequent molding step) without adding any further organic peroxide.

Method B

In this invention, the following method B can be suitably employed for the step 1.

In this method B, the foregoing crystalline resin and the foregoing electrically conductive particles are mixed in the foregoing amounts without adding any crosslinking agent such as the organic peroxide, etc., and a crosslinking auxiliary, and these components are mutually mixed to obtain a mixture.

In this case, the mixing temperature is generally set at a temperature of not lower than the melting point of the crystalline resin, and in order to further improve the dispersibility of the electrically conductive particles in the resin, it is preferably set at a temperature which is not less than 20° C. higher than the melting point of the resin. In this method, no crosslinking agents, etc., such as the organic peroxide are present when the mixing is carried out. Therefore, the upper limit of the mixing temperature can be suitably set such that deterioration under decomposition of the resin and coloring do not occur.

Such a mixture may be recovered in any form, and in general, it is recovered in a pellet form.

The mixing treatment in the step 1, including the above methods A and B, can be carried out by various kneaders such as a dispersion mixer, a twin-screw kneader, a kneading open roll, a Banburry mixer, a single screw reciprocator, a single screw extruder, a twin-screw extruder, etc. Particularly preferred are a dispersion mixer, a twin-screw extruder, and a twin screw kneader, which can fully mix and disperse the contents.

The step 1 is carried out as described above, whereby the mixture formed by mixing the crystalline resin and at least electrically conductive particles can be obtained in various forms suitable for the molding thereof such as pellets, etc., continuously, intermittently or noncontinuously.

The mixture obtained as described above (which comprises at least the crystalline resin and the above electrically conductive particles) is transferred to a next kneading/crosslinking and molding step (to be sometimes referred to as "step 2" hereinafter).

In the process of this invention, the above mixture obtained in the step 1 is transferred to the step 2, in which the mixture is kneaded, crosslinked and molded to produce a desired form of a molded article having positive temperature coefficient characteristics. The important point is that in this step 2, the mixture is subjected, under a sufficient shear force, to crosslinking of the resin under an action of the organic peroxide and kneading and subjected to simultaneous or subsequent molding of the kneaded mixture.

The shear force to be applied cannot be uniformly defined, since it differs depending upon resins, electrically conductive particles, and properties and proportions of these. In general, however, such a shear force is not less than 0.005 kw.h/kg, preferably 0.01 to 0.5 kw.h/kg.

The above shear force can be applied within a suitable molding machine, and therefore, the above crosslinking and the above simultaneous or subsequent molding can be carried out successively in one molding machine. Thus, the efficiency of the production step can be further improved. It is naturally possible to optionally employ a method, in which the crosslinking/kneading under a shear force is carried out in a kneading machine connected to a molding machine or a kneading portion of a molding machine, and the kneaded mixture is molded in the molding machine.

When the above crosslinking/kneading in the step 2 is carried out under an inadequate application of a shear force, it is not possible to attain both sufficient improvement of the positive temperature coefficient characteristics and sufficient properties on heat resistance and mechanical strength. Thus, the objects of this invention cannot be fully achieved.

In addition, the organic peroxide may be contained in the above mixture to be transferred to the step 2 as described above, or may be added to the mixture for the first time in the step 2, or an additional amount of the organic peroxide may be added in the step 2. In short, it is sufficient to allow the above mixture to contain the organic peroxide such that the crosslinking can be achieved in the step 2.

In the above step 2, the crosslinking/kneading is carried out while applying a shear force on the mixture containing the crystalline resin, the electrically conductive particles and the organic peroxide. A molded article having excellent positive temperature coefficient characteristics can be obtained for a shorter period of time by carrying out the crosslinking at a sufficiently high temperature. For that purpose, in general, it is preferable to carry out the crosslinking at a temperature which is not less than 20° C. higher than the one minute half-value period temperature of the organic peroxide contained in the mixture.

The kneaded mixture obtained by the crosslinking and the kneading at the same time can be molded with an ordinary molding machine.

The form of the molded article having positive temperature coefficient characteristics, provided by this invention as described above, is not specially limited.

Such a molded article can be produced in a form of a sheet, post, wire, fiber, cylinder, etc., as required.

The molded article having positive temperature coefficient characteristics, provided by this invention, is provided with an electrode when used. The electrode may be provided thereto according to a usual method. For example, an electrode can be formed by screen-printing or applying a silver paste on/to a predetermined place on a surface of the molded article having positive temperature coefficient characteristics. It can be also formed by attaching a metal foil under pressure or by further etching the foil into a desired form.

Further, as required, the electrode can be also formed integrally with a molded article by inserting an electrode wire through the die (extrusion) portion of a molding machine, and extruding the mixture (resin composition) so as to cover the wire. Furthermore, other various methods can be employed. For example, a linear molded article with such a covered electrode is produced and attached to a molded article having positive temperature coefficient characteristics, provided by this invention.

A lead wire is also connected to the electrode. For this purpose, the form of a molded article having positive temperature coefficient characteristics, provided by this invention, can be variously devised so as to connect such a lead wire.

The material for the above electrode is not specially limited, and can be selected from silver, copper, nickel, aluminum, gold, etc. As required, the material can be also selected from various metal wires of an alloy of these metals. nickel-plated copper, tin-plated copper, etc.

The molded article obtained according to the process of this invention specified hereinbefore has excellent stability and uniformity in resistance value, and in particular, it has excellent positive temperature coefficient (PTC) characteristics that the increase ratio of its resistance value to temperature is high and that the resistance value increases uniformly up to a comparatively high temperature. Therefore, such a molded article can be advantageously used as a heating element and an overcurrent protective element for various uses in a wide range of fields.

This invention will be explained further in detail by reference to following Examples, which, however, shall not limit this invention.

EXAMPLE 1

40 Parts by weight of carbon black having an average particle diameter of 43 nm [Diablack E. supplied by Mitsubishi Chemical Ltd.) and 0.5% by weight, based on the following EEA resin, of 2,5-dimethyl-2,5-di(tert-butylperoxy)hexyne-3 [Perhexyne 25B, one minute half-value period temperature 193° C., supplied by Nihon Yushi K.K.) were added to 60 parts by weight of an ethylene-ethyl acrylate copolymer [EEA resin (melting point 90° C.), supplied by Nihon Unicar K.K. DPDJ 6182], and the resultant mixture was fed to a twin-screw extruder [PCM-30, supplied by Ikegai Iron Works] to form a mixture at 120° C. at 5,000 g/hr, and extruded in a strand form. And, the extrudate was cut to give a pellet-formed mixture in which the EEA resin was substantially not crosslinked (step 1).

The pellet-formed mixture above was fed to a single screw extruder (supplied by Tanabe Plastic Machinery, 25 mm$\phi$), and subjected to the crosslinking of the EEA resin and the kneading of the mixture at 50 rpm under a shear force energy of 0.06 kw.h/kg at a temperature of 260° C. (temperature of the mixture), and successively, the kneaded mixture was molded into a long sheet having a width of 220 mm and a thickness of 0.5 mm by extruding it through a sheet die (step 2).

EXAMPLE 2

60 Parts by weight of the same EEA resin as that described in Example 1 and 40 parts by weight of the same carbon black as that described in Example 1 were fed to a twin-screw extruder, mutually mixed at 210° C. at 5,000 g/hr and extruded in a strand form. The extrudate was cut to give a pellet-formed mixture in which the EEA resin was substantially not crosslinked (step 1).

The same Perhexyne 25B as that described in Example 1 in an amount of 0.2% by weight based on the EEA resin was added to the above pellet-formed mixture, and the resultant mixture was fed to a single-screw extruder and subjected to the crosslinking and kneading in the same way (shear force energy 0.05 kw.h/kg) as in Example 1, and also molded in the same way as in Example 1 to give a long sheet having a thickness of 0.5 mm (step 2).

EXAMPLE 3

60 Parts by weight of the same EEA resin as that described in Example 1 and 40 parts by weight of the same carbon black as that described in Example 1 were mutually mixed at 120° C. for 15 minutes with a dispersion mixer (supplied by Moriyama Mfg. Works Ltd., 3 lit.], and 0.5% by weight, based on the EEA resin, of Perhexyne 25 B was added. These components were further mixed at 120° C. for 10 minutes to give a mixture in which the crosslinking of the EEA resin was not completed (step 1).

The above noncrosslinked mixture was formed into a sheet with rolls, and the sheet was cut to form pellets having about a size of 5 mm×5 mm. The pellets were fed to a single-screw extruder, subjected to the crosslinking and kneading in the same way (shear force energy 0.05 kw.h/kg) as in Example 1, and molded in the same way as in Example 1 to give a long sheet having a thickness of 0.5 mm (step 2).

COMPARATIVE EXAMPLE 1

The step 1 in Example 1 was repeated to obtain a pellet-formed mixture in which the EEA resin was not crosslinked.

The pellet-formed mixture was melted and pressurized with a heat-pressing machine at 193° C. for 20 minutes without applying any shear force, whereby a sheet having a thickness of 0.5 mm was formed.

COMPARATIVE EXAMPLE 2

The same starting materials as those used in the step 1 of Example 1 were treated in the same way as in said step 1 except that the mixing temperature was set at 260° C. thereby to carry out the mixing and the crosslinking of the EEA resin at the same time, whereby crosslinked pellets were obtained.

The crosslinked pellets were fed to a single-screw extruder and treated in the same way as in Example 1 to form a long sheet having a thickness of 0.5 mm.

COMPARATIVE EXAMPLE 3

A noncrosslinked pellet-formed mixture obtained in the same way as in Example 3 was melted and pressurized with a heat-pressing machine at 193° C. over 20 minutes without applying any shear force, whereby a sheet having a thickness of 0.5 mm was obtained.

COMPARATIVE EXAMPLE 4

3,000 Grams of a mixture of 60% by weight of the same EEA resin as that described in Example 1 with 40% by weight of the same carbon black as that described in Example 1 was kneaded with a dispersion mixer (supplied by Moriyama Mfg. Works, Ltd., 3 lit.) at 193° C. over 15 minutes, and then 0.5% by weight, based on the EEA resin, of Perhexyne 25 B was added. These components were further kneaded at 193° C. over 10 minutes to complete the crosslinking of the EEA resin.

The resultant crosslinked kneaded mixture was formed into a sheet with rolls, and the sheet was cut into pellets having about a size of 5 mm×5 mm. The pellets were fed to a single-screw extruder, and molded into a sheet having a thickness of 0.5 mm in the same way as in Example 1.

EXAMPLE 4

37 Parts by weight of the same carbon black as that used in Example 1 was added to 63 parts by weight of a low-density polyethylene resin (Petrothene 170, supplied by TOSOH K.K.) as a crystalline resin, and they were mixed with a dispersion mixer at 150° C. over 15 minutes. Then, 0.3% by weight, based on the low-density polyethylene, of Perhexyne 25B was added and further mixed at 150° C. for 3 minutes to obtain a mixture in which the low-density polyethylene resin was substantially not crosslinked. The mixture was extruded in a sheet form, and the extrudate was cut into pellets having about a size of 5 mm×5 mm (step 1).

The above pellets were fed to a single-screw extruder, and subjected to the same crosslinking and kneading as those in Example 1, and molded in the same way as in Example 1, whereby a long sheet was obtained (step 2). The shear force energy at the kneading time was 0.05 kw.h/kg.

COMPARATIVE EXAMPLE 5

The step 1 in the Example 4 was repeated to prepare pellets in which the crosslinking of the low-density polyethylene was not completed. The pellets were melted and pressurized with a heat-pressing machine at 193° C. for 20 minutes without applying any shear force, whereby a sheet having a thickness of 0.5 mm was formed.

As shown in FIG. 1, a test piece 1 having a length (L) of 20 mm, a width (W) of 11 mm and a thickness (T) of 0.5 mm was taken from each of the sheets prepared in the above Examples and Comparative Examples. A silver paste was applied to each of the test pieces along its length in a width (w) of 3 mm on both sides to form an electrode 2, whereby an electrode-attached test piece 3 was prepared.

Figure 2:
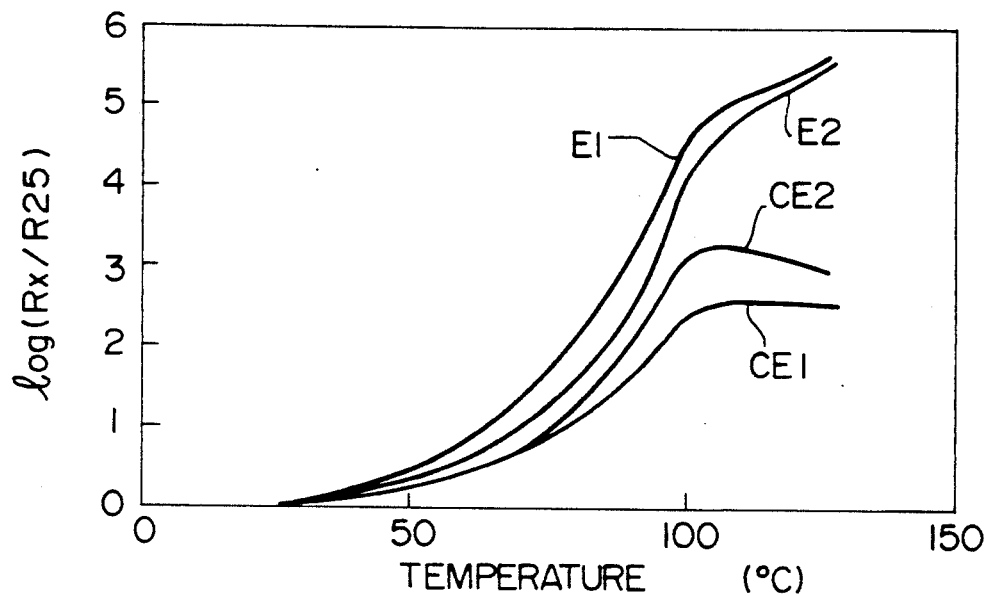
FIGS. 2 and 3 are graphs for temperature-resistance increase rate characteristics, measured on electrode-attached test pieces of a molded article having positive temperature coefficient characteristics, produced according to the process of this invention and electrode-attached test pieces of a molded article having positive temperature coefficient characteristics, produced as a comparative example according to a conventional method.
Figure 3:
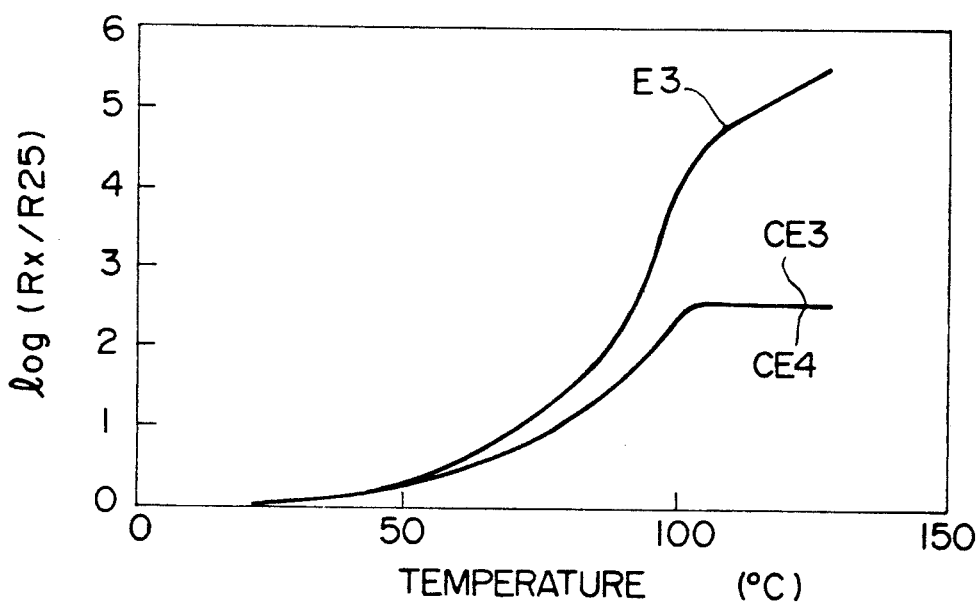

The electrode-attached test piece was measured within a constant-temperature bath for a resistance value (resistivity) while the temperature therein was elevated from 20° C. to 130° C., whereby characteristic charts for temperature-resistance value ratio were obtained as shown in FIGS. 2 and 3, in which the abscissa axis indicates temperatures (unit: °C.) and the ordinate axis indicates resistance value increase ratios [ratio of a resistance value (R) at each temperature to a resistance value (R25) at 25° C.] in a logarithm. In FIGS. 2 and 3, curves E1, E2 and E3 show temperature-resistance value increase ratio curves of the test pieces of Examples 1, 2 and 3, respectively, and curves CE1, CE2, CE3 and CE4 show temperature-resistance value increase ratio curves of the test pieces of Comparative Examples 1, 2, 3 and 4, respectively.

Further, Table 1 summarizes maximum resistance value increase ratios of the test pieces at 130° C., taken from the above characteristic charts, and resistivities at 25° C.

In addition, the static voltage resistance of each test piece was measured in the following manner. An alternating voltage of 100 V was applied between the electrodes and the test piece was maintained at this state for 3 minutes. Then, the voltage was increased by 50 V each and the test piece was maintained for 3 minutes. This procedure was repeated. The static voltage resistance was evaluated on the basis of a voltage value at which the test piece was burned out and broken. Table 1 shows results of the static voltage resistance measurement.

TABLE 1

| | Resistivity (25° C.) $\Omega \cdot cm$ | Maximum resistance value increase ratio (130° C.) | Static voltage resistance |
|---|---|---|---|
| Example 1 | 21 | $10^{5.7}$ | >1,100* |
| Example 2 | 22 | $10^{5.7}$ | >1,100* |
| Example 3 | 18 | $10^{5.7}$ | >1,100* |
| Example 4 | 28 | $10^{6.8}$ | >1,100* |
| Comparative Example 1 | 6 | $10^{2.7}$ | 350 |
| Comparative Example 2 | 23 | $10^{3.3}$ | 450 |
| Comparative Example 3 | 8 | $10^{2.7}$ | 350 |
| Comparative Example 4 | 18 | $10^{2.7}$ | 350 |
| Comparative Example 5 | 12 | $10^{4.0}$ | 900 |

Note: The above asteriks (*) means that the test piece was not broken at 1,100 volts.

As is clear from Table 1 and FIGS. 2 and 3, molded articles produced by carrying out the crosslinking and kneading under a shear force and simultaneously or subsequently molding the resultant kneaded mixture (with a single-screw extruder), i.e. the molded articles according to the process of this invention exhibit very high resistance value increase ratio (positive temperature coefficient characteristics).

Meanwhile, molded articles produced by pressure-molding crosslinked mixtures under a shear force (Comparative Examples 2 and 4) and molded articles produced without applying any shear force (Comparative Examples 1 and 3) show low resistance value increase ratio (insufficient positive temperature coefficient characteristics).

In addition, a PTC material having a higher resistance value increase ratio has better voltage performance (voltage resistance) when a voltage is charged (applied). and hence has higher safety. And, a PTC material having a higher resistance value increase ratio has higher sensitivity to a thermal change in resistance value, and hence functions as a material having higher accuracy.

Further, in the step 2, the crystalline resin is crosslinked at a high temperature under a shear force, whereby a molded article having excellent positive temperature coefficient characteristics can be obtained in a short time.

This invention employs a process which comprises mixing/dispersing at least electrically conductive particles with/in a crystalline resin in a substantially non-crosslinked state to prepare a mixture, then kneading the mixture under a shear force while the resin is crosslinked under an action of an organic peroxide, and simultaneously or successively molding the kneaded mixture. Therefore, this invention produces the following effects.

(1) The resultant molded article has excellent positive temperature coefficient characteristics. That is, the molded article according to this invention has remarkably improved resistance value increase ratio to an increase in temperature as compared with a conventional molded article having positive temperature coefficient characteristics, and that the molded article according to this invention can maintain this excellent characteristics up to a comparatively high temperature (i.e. the resistance value can be increased up to a higher temperature than that of a conventional molded article).

The use of a molded article having such excellent positive temperature coefficient characteristics can increase safety such as dielectric strength performance, etc., to a great extent.

(2) Since a mixture in which the crosslinking is substantially inhibited can be supplied to a step for the kneading/crosslinking and the molding, the molding can be carried out easily, and the continuous production is possible. Further, since the crosslinking is carried out under the foregoing specific conditions while the kneading is carried out, the crosslinking can be enhanced sooner than that in a conventional process. As a result, the productivity of a molded article can be greatly improved, and the production cost can be fully decreased.

(3) When the mixture to be supplied to a kneading/crosslinking and molding step is prepared, the resin is not required to be substantially crosslinked regardless of presence or absence of the organic peroxide. Therefore, the electrically conductive particles can be advantageously uniformly dispersed in the resin. For this reason, the stability and uniformity of the resultant resin can be maintained at a high level. This point is also considered to be one of the factors for excellent positive temperature coefficient characteristics which the resultant molded article has as described in the above (1).

That is, the process of this invention makes it possible to advantageously produce a molded article having excellent positive temperature coefficient characteristics from a resin composition (mixture) having excellent characteristics as described above.

What is claimed is:

1. A process for the production of a molded article having positive temperature coefficient characteristics, which comprises mixing a crystalline resin with electrically conductive particles to prepare a uniform mixture without crosslinking the crystalline resin substantially; crosslinking the crystalline resin with an organic peroxide at a temperature which is not less than 20° C. higher than a one minute half-value period temperature of the organic peroxide while kneading the mixture under a shear force of 0.01 to 0.5 kw.h/kg; and simultaneously or successively extrusion molding the resultant kneaded mixture.

2. The process according to claim 1, wherein the crystalline resin is selected from the group consisting of a polyolefin resin and an olefin copolymer.

3. The process according to claim 1, wherein the electrically conductive particles comprise carbon black particles having a particle diameter of 10 to 200 nm.

4. The process according to claim 1, wherein the mixture is obtained by mixing the crystalline resin, the electrically conductive particles and, optionally, organic peroxide at a temperature between a temperature which is 20° C. higher than a melting point of the crystalline resin and a temperature which is 20° C. lower than a one minute half-value period temperature of the organic peroxide.

5. The process according to claim 1, wherein the crystalline resin is selected from the group consisting of a polyolefin resin, an olefin copolymer, a polyamide resin, a polyacetal, a thermoplastic polyester resin, a polyphenylene oxide, a nonyl resin and a polysulfone.

6. The process according to claim 1, wherein the crystalline resin is selected from the group consisting of polyethylene, polypropylene, polybutene, 4-methylpentene, syndiotactic polystyrene, an ethylene-propylene copolymer, an ethylene-vinyl acetate copolymer, an ethylene-acrylate copolymer, a copolymer of an olefin with a vinyl compound, a fluorine-containing ethylene copolymer, nylon 6, nylon 8, nylon 11, nylon 66, nylon 610, a vinyl acetate resin, polyvinylacetoacetal, polyvinyl butyral, polypropylene terephthalate, polybutylene terephthalate, trans-1,4-polyisoprene and syndiotactic-1,2-polybutadiene.

7. The process according to claim 1, wherein the crystalline resin is selected from the group consisting of high-density polyethylene, low-density polyethylene, linear polyethylene, ethylene-vinyl acetate copolymer, ethylene-ethyl acrylate copolymer, fluorine-containing ethylene copolymers and diene-based polymers.

8. The process according to claim 7, wherein the electrically conductive particles are selected from the group consisting of carbon black particles, graphite particles, metal powders, metal oxide powders and carbon fibers.

9. The process according to claim 8, wherein the electrically conductive particles have an average particle diameter of 15 to 100 nm and an aspect ratio of 1 to 1,000.

10. The process according to claim 9, wherein the electrically conductive particles have an aspect ratio of 1 to 100.

11. The process according to claim 10, wherein electrically conductive particles are carbon black particles and the proportion by weight of the crystalline resin to the carbon black particles is 10–80:90–20.

12. The process according to claim 11, wherein the crystalline resin is an ethylene-ethylacrylate copolymer having a melting point of 90° C.

13. The process according to claim 11, wherein said proportion by weight is 55–75:45–25.

14. The process according to claim 13, wherein the organic peroxide is selected from the group consisting of benzoyl peroxide, lauroyl peroxide, dicumyl peroxide, tert-butyl peroxide, tert-butylperoxybenzoate, tert-butylcumyl peroxide, tert-hydroperoxide, 2,5-dimethyl-2,5-di(tert-butylperoxy)hexane, 2,5-dimethyl-2,5-di(tert-butylperoxy)hexyne-3, 1,1-bis(tert-butylperoxyisopropyl)benzene, 1,1-bis(tert-butylperoxy)-3,3,5-trimethylcyclohexane, n-butyl-4,4-bis(tert-butylperoxy)valarate, 2,2,bis(tert-butylperoxy)butane and tert-butylperoxybenzene.

15. The process according to claim 14, wherein the organic peroxide is an amount of 0.01 to 5 parts by weight per 100 parts by weight of the crystalline resin.

16. The process according to claim 13, wherein the organic peroxide is 2,5-dimethyl-2,5-di(tert-butylperoxy)hexane-3.

17. The process according to claim 16, wherein the organic peroxide is in an amount of 0.05 to 2 parts by weight per 100 parts by weight of the crystalline resin.

* * * * *